(12) United States Patent
Hofman

(10) Patent No.: US 8,704,889 B2
(45) Date of Patent: Apr. 22, 2014

(54) METHOD AND APPARATUS FOR ACQUIRING IMAGES OF CAR LICENSE PLATES

(75) Inventor: Yoram Hofman, Kefar Bialik (IL)

(73) Assignee: Hi-Tech Solutions Ltd., Yokneam (IL)

( * ) Notice: Subject to any disclaimer, the term of this patent is extended or adjusted under 35 U.S.C. 154(b) by 266 days.

(21) Appl. No.: 13/049,148

(22) Filed: Mar. 16, 2011

(65) Prior Publication Data
US 2011/0228085 A1 Sep. 22, 2011

Related U.S. Application Data

(60) Provisional application No. 61/314,440, filed on Mar. 16, 2010.

(51) Int. Cl.
*H04N 7/18* (2006.01)
(52) U.S. Cl.
USPC ............. 348/143; 348/E7.085; 382/105
(58) Field of Classification Search
USPC .............. 348/143, E7.085; 382/105
See application file for complete search history.

(56) References Cited

U.S. PATENT DOCUMENTS

| | | | | |
|---|---|---|---|---|
| 5,591,972 A | * | 1/1997 | Noble et al. | 250/330 |
| 5,942,753 A | * | 8/1999 | Dell | 250/338.1 |
| 6,650,765 B1 | | 11/2003 | Alves | |
| 7,016,518 B2 | * | 3/2006 | Vernon | 382/105 |
| 7,711,150 B2 | * | 5/2010 | Simon | 382/105 |
| 2005/0029347 A1 | * | 2/2005 | Noble et al. | 235/384 |
| 2006/0056658 A1 | * | 3/2006 | Kavner | 382/105 |
| 2006/0269105 A1 | * | 11/2006 | Langlinais | 382/105 |
| 2007/0133844 A1 | * | 6/2007 | Waehner et al. | 382/118 |
| 2008/0063280 A1 | * | 3/2008 | Hofman et al. | 382/182 |
| 2008/0131001 A1 | | 6/2008 | Hofman et al. | |
| 2008/0285803 A1 | * | 11/2008 | Madsen | 382/105 |
| 2008/0285804 A1 | * | 11/2008 | Sefton | 382/105 |
| 2009/0167865 A1 | * | 7/2009 | Jones, Jr. | 348/149 |
| 2009/0196033 A1 | * | 8/2009 | MacDonald | 362/234 |
| 2009/0207046 A1 | * | 8/2009 | Arrighetti | 340/937 |
| 2009/0262189 A1 | * | 10/2009 | Marman | 348/143 |

* cited by examiner

*Primary Examiner* — Christopher S Kelley
*Assistant Examiner* — Ana Picon-Feliciano
(74) *Attorney, Agent, or Firm* — Lowenstein Sandler LLP; Ariel Reinitz

(57) ABSTRACT

Apparatus and method for acquiring images of car license plates, the apparatus is configured to be part of an LPR (License Plate Recognition) system. The apparatus includes a camera, a multi band-pass filter, LEDs (Light Emitting Diodes) and an illumination control board. The camera is configured for acquiring the images, having a focus shift corrected lens. The multi band-pass filter is coupled to the focus shift corrected lens, being configured for allowing only wavelengths of multiple predetermined spectrum ranges to reach the lens. Each one of said LEDs is configured for emitting light in at least one of the multiple predetermined spectrum ranges for the purpose of illuminating the car license plates and their vicinity. The illumination control board is coupled to the LEDs and to the camera, for controlling operation thereof.

18 Claims, 2 Drawing Sheets

METHOD AND APPARATUS FOR ACQUIRING IMAGES OF CAR LICENSE PLATES

CROSS REFERENCE TO RELATED APPLICATIONS

This application claims the benefit of U.S. Provisional Patent Application Ser. No. 61/314,440 filed Mar. 16, 2010, the disclosure of which is incorporated herein by reference in its entirety.

FIELD OF THE INVENTION

The invention relates to image acquiring. More specifically, the invention relates to acquiring images to be used in LPR (License Plate Recognition) applications.

BACKGROUND OF THE INVENTION

License Plate Recognition

License Plate Recognition (LPR), also known as Automatic Number Plate Recognition (ANPR), is a method, known for those versed in the art, for automatically reading a vehicle registration string off a license plate. An imaging system used for LPR uses a camera to capture one or more images of the front and/or rear license plates while it should be appreciated that each image potentially contains information relating to the license plate. A license plate includes alphanumeric characters and/or possibly other signs, forming the registration string and used for vehicle recognition. In order to allow automatic recognition of the registration string it may be desired to increase the contrast between the license strings' signs and their background, hence the LPR system normally employs illumination units, which are either based on constant lighting or pulsed illumination.

Those versed in the art know that alphanumeric characters can be scanned and processed via an Optical Character Recognition (OCR) process. An OCR process is described, e.g., in US 2008/0131001 ("Multi level Neural Network based characters Identification Method and system", Hofman and Margolin, published on 2008), describing a system and a method, which enable automatic identification of characters while performing and calibrating data verification to ensure data reliability. The system described in US 2008/0131001 can process these identified characters, such as override adverse conditions, adjusting and correcting unclear characters and their images.

Factors Affecting Recognition Success

LPR systems require high level of accuracy as well as reports on the confidence of the results. Error in the recognition process may cause undesired consequences, such as billing wrong drivers (in toll roads), launching security forces due to wrong recognition of a vehicle (in security systems), preventing access from an authorized vehicle (in gates), and so on. Therefore it is important to employ special techniques that increase the accuracy and prevent recognition errors.

It is possible to categorize the success of an LPR process based on a number of parameters and factors, constituting "affecting parameters", including internal factors, plate complexity, external factors, plate make and condition:

Internal factors include, e.g., the quality of the LPR program, the resolution and quality of the camera, the quality and type of illumination, the field of view.

Plate complexity includes, for example, the possible combinations of the legal alphanumeric strings, presence of graphics and special symbols, the use of multiple rows or staggered letters, use of abnormal font types, use of colors, etc.

External factors include parameters such as environmental parameters (indicative, for example, of the sun's intensity and radiation, glare, rain, fog, etc.) and parameters relating to the vehicle (such as the speed of the vehicle, etc.).

The condition of the plate is affected, e.g., by obscuring elements—such as vehicle hooks, license frames, screws and dents.

The plate make depends, for example, on the quality of the paint, whether the plate is retro-reflective or reflective, the contrast and colors of the alphanumeric characters and their background.

Efforts have been done, in the past, to cope with these factors or with part thereof. For example, U.S. Pat. No. 6,650,765 ("System for simultaneously imaging vehicles and their license plate", Alves, published on 2001), describes a vehicle video imaging system that comprises a white-light LED array for illuminating retro-reflective painted parts of a vehicle's license plate, a powerful flash with a visual spectrum cutout filter and a polarizing filter for illuminating any non-retro-reflective license plate paint and the vehicle itself. A video camera with a polarizing filter turned 90 degree relative to the one in front of the flash receives the illuminated image of the vehicle and its license plate. The retro-reflective paint of a license plate will return polarized light as it is received, so the white-light LED array will provide all the illumination needed by the camera to get a good high-contrast picture of the license plate. The polarizing filters will combine to block out most of the light from the flash that was returned still-polarized by the retro-reflective-paint license plate. All other surfaces that do not have retro-reflective paint will bounce-back and scatter the light from both the polarized flash and non-polarized light.

Contrast Enhancement

Amongst the steps of OCR are segmentation of the alphanumeric characters (detecting each character position) and identification of each character. During these steps the contrast of the characters in relation to their background is an important factor, assisting in differentiating the characters from their background. Acceptably, around 20% contrast provides satisfactory results in the ability of separating the characters and identifying them correctly. However, due to the affecting parameters described above the images obtained from the cameras may suffer from low differentiation. Although the OCR process can attempt to increase the contrast using various known pre-se methods such as histogram modification, the input quality is a limiting factor that drives the overall results to lower recognition rates and prevents repeatability of the results.

There are known optical contrast enhancement techniques, such as illuminating the license plate with a narrow spectrum, for example near-infrared (near-IR), which is different from the color of the characters and/or the background. Additionally or alternatively, it is possible to use an optical band pass filter in the optical path between the camera and the license plate in order to filter out light in other spectrums. The resulting image is expected to have higher character contrast, which may improve the OCR results.

Presently, many LPR systems use near-IR spectrum as their preferred spectrum, since the driver cannot see this bandwidth and thus, a high level of illumination may be used without affecting the driver. Typical spectrums include, e.g., 850 nM, 880 nM or 950 nM. This spectrums' range (near infrared, shortly denoted "near-IR") also has acceptable results in outdoor installations.

For example, U.S. Pat. No. 5,591,972 ("Apparatus for reading optical information", Noble et al., published on 1997) discloses an apparatus for illuminating a distant object such as a vehicle license plate, and for reading optical information on the distant object. The apparatus is a unit which includes a radiation source for illuminating a selected area of the object and a CCD camera for receiving radiation from the object and for producing an electrical signal representative of optical information on the object. The radiation source is coaxial with an imaging lens of the camera and includes arrays of LED's spaced around an optical axis passing through the imaging lens. The LED's emit radiation in the near infrared region and are strobed at a predetermined frequency during the acquisition of the information.

One problem of using near-IR spectrum in an LPR implementation is that in some places, such as Massachusetts (in United States) or Belgium (in Europe), license plates make use of red color, either for the license plate background or for the characters. For such plates, the use of near-IR spectrum results in a low contrast, since the background of the plate is illuminated with the same color of the characters (or opposite: the characters are illuminated with the background color). Therefore, LPR systems for such plates require a different spectrum, probably in the visible range, such as yellow (e.g., 590 nM), which results in improved contrast.

Furthermore, in many cases different license plates exist in the same place and on the same time. Hence, many LPR installations have to cope with such mixed-plates situation, e.g., by having a stereo system using dual spectrums—such as a combination of near-IR and visible color. Each spectrum provides a respective image while it is possible to select the best image out of multiple spectrums. Such LPR systems use two cameras—one with near-IR filter and illumination, and the other with a visible color such as yellow.

In the stereo systems, each camera is often used for capturing multiple images, each image is captured using a different illumination level, wherein one image is selected out of the series of images, and the confidence of the reported result is determined based on the repetition and quality of the recognitions.

Another feature of the presently existing stereo-systems using dual spectrum solution is to allow video motion detection (VMD) to operate in covert IR mode, wherein firing the visible illumination is done a brief moment after the vehicle is detected.

Yet, there is a need in the art for compact, non-expensive modules for acquiring images of car license plates.

SUMMARY OF THE INVENTION

It is therefore an object of the invention to provide an apparatus and a method for acquiring images of car license plates.

In accordance with the invention, there is provided an apparatus for acquiring images of car license plates, the apparatus is configured to be part of an LPR (License Plate Recognition) system, the apparatus comprising:
  a. a camera for acquiring the images, having a focus shift corrected lens;
  b. a multi band-pass filter coupled to said focus shift corrected lens, configured for allowing only wavelengths of multiple predetermined spectrum ranges to reach said lens;
  c. LEDs (Light Emitting Diodes), each one of said LEDs is configured for emitting light in at least one of said multiple predetermined spectrum ranges for the purpose of illuminating the car license plates and their vicinity; and
  d. An illumination control board coupled to said LEDs and to said camera, for controlling operation of said LEDs and of said camera.

According to one embodiment, additional or alternative to any other embodiment described herein, the control board is configured to control timing of operation of said LEDs and said camera.

According to another embodiment, additional or alternative to any other embodiment described herein, the control board is configured to control illumination levels of said LEDs.

According to yet another embodiment, additional or alternative to any other embodiment described herein, the control board is configured to select a subgroup of said LEDs and to control operation of said subgroup.

In another embodiment, additional or alternative to any other embodiment described herein, the multiple predetermined spectrum ranges include two predetermined spectrum ranges.

In yet another embodiment, additional or alternative to any other embodiment described herein, the multiple predetermined spectrum ranges include at least three predetermined spectrum ranges.

In one embodiment, additional or alternative to any other embodiment described herein, one of the multiple predetermined narrow band spectrums is near IR (Infra Red) and wherein the focus shift corrected lens is a day/night lens.

In yet another embodiment, additional or alternative to any other embodiment described herein, one of the multiple predetermined narrow band spectrums is unseen to a human eye.

According to one embodiment, additional or alternative to any other embodiment described herein, the narrow band spectrums unseen to the human eye is near IR (Infra Red).

In yet another embodiment, additional or alternative to any other embodiment described herein, the apparatus is useable for Vehicle Motion Detection (VMD).

According to another embodiment, additional or alternative to any other embodiment described herein, the apparatus is useable for vehicle body color recognition.

The invention further provides a method for acquiring images of car license plates, the method comprising:
  a. emitting emitted light in at least one of multiple predetermined spectrum ranges to yield reflected light from a car license plate;
  b. filtering reflected light so as to allow only filtered light of wavelengths of said multiple predetermined spectrum ranges to reach a sensor of a camera; and
  c. acquiring multiple images of the car, wherein at least one image is acquired for each one of said multiple predetermined spectrum ranges emitted in (a);

According to one embodiment, additional or alternative to any other embodiment described herein, the method further comprising:
  controlling said emitting light and said acquiring the image.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF THE INVENTION

In addition, unless specifically noted, embodiments described or referenced in the present description can be additional and/or alternative to any other embodiment described or referenced therein.

It is noted that hereinafter, there is provided a description referring to license plates using alphanumeric characters. However, this should not limit the invention which may be applicable to license plates using any type of signs, including signs which are not alphanumeric.

Figure 1:
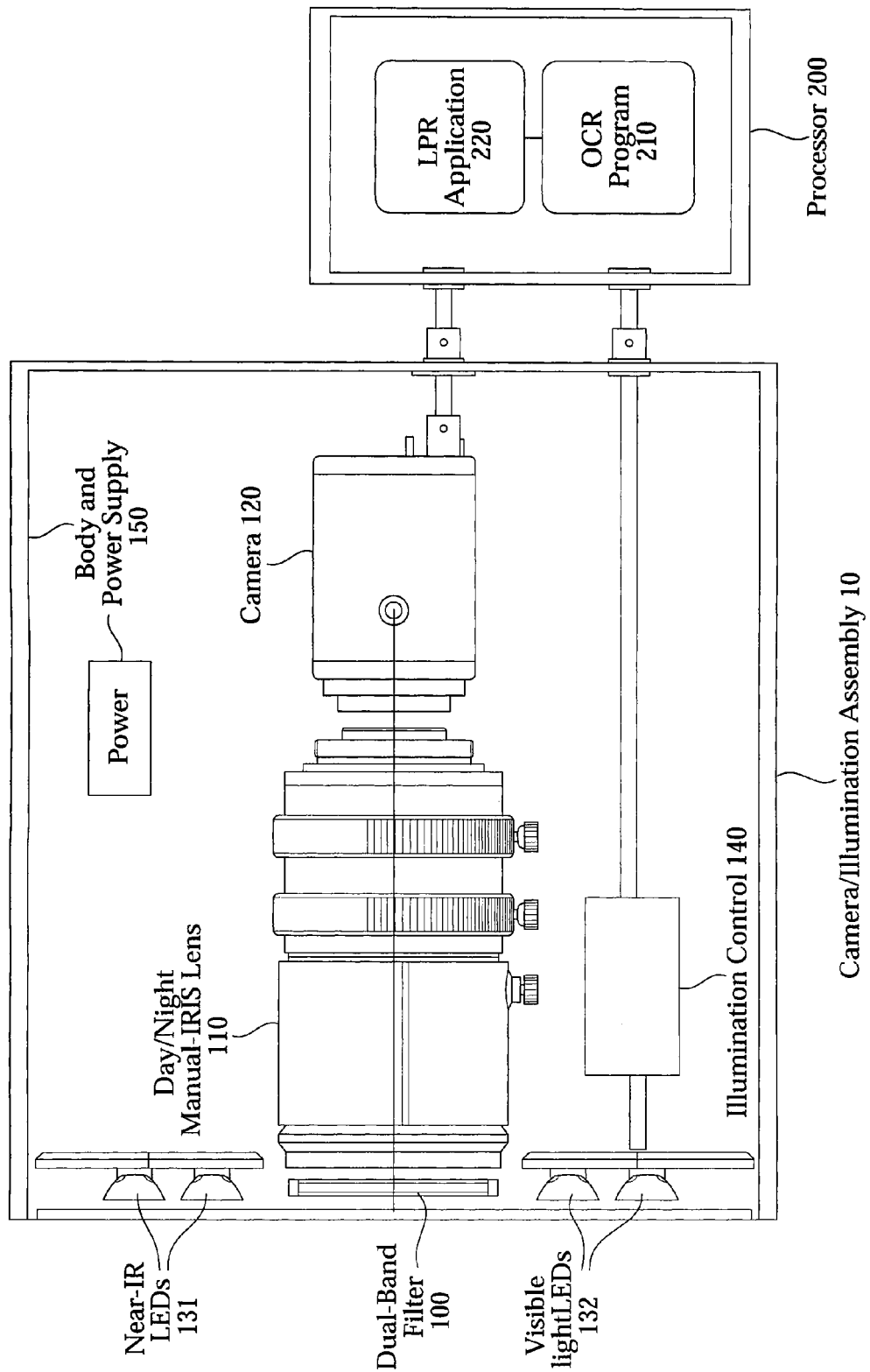
FIG. 1—Camera/Illumination head assembly and LPR system design, according to one embodiment of the invention.

According to one embodiment of the invention illustrated in FIG. 1, an LPR system is disclosed, wherein only a single camera and its related optics (e.g., lens, filter, illumination) is used within an apparatus 10, instead of using two cameras and their related optics, as presently done in LPR systems. The apparatus 10 constitutes a "camera/illumination assembly", or an "image acquiring module". The resulting imagery of the apparatus 10 used for acquiring images of car license plates, yields a plate image quality that allows license plate recognition.

According to the embodiment of FIG. 1, a system consists of the several components, for example:

100 A single Dual band-pass filter—according to the non-limiting presently discussed example, the filter passes two narrow spectrums: yellow and near-IR.
110 A single lens—having a manual Iris, IR (infra red) corrected.
120 Analog or Digital Camera which captures the images.
131-132 Light Emitting Diodes (LEDs)—according to the non-limiting presently discussed example, the LEDs form a combination of near-IR power LEDs (131) and yellow LEDs (132).
140 Illumination control module—The illumination intensity in each spectrum can be controlled with 4 levels separately.
150 Camera body and power supply.

It is appreciated that different components may be coupled to the camera/illumination assembly, such as:

200 OCR Processor.
210 OCR program.
220 LPR application.

It is noted though that the embodiment illustrated in FIG. 1 is non-limiting and other alternatives are allowed when and if applicable. For example, in one such alternative embodiment the filter 100 may pass other spectrums and/or another number of spectrums (not necessarily two). Moreover, the invention is capable of handling multiple predetermined narrow band spectrum ranges, while multiple should be considered as any number greater than one (i.e., two, three etc.). Alternative embodiments may allow more/less than four intensity levels in the illumination control module 140, use alternative and/or additional colors of LEDs, etc. Furthermore, although near-IR is brought throughout the specification as an example, it should be appreciated that this is non-limiting too and other embodiments may be adapted for any multiple predetermined narrow band spectrum ranges, including or not-including near-IR. Similarly, yellow emission is also described throughout the specification as an example, while it should be appreciated that this is non-limiting too and other embodiments may be adapted for any multiple predetermined narrow band spectrum ranges, including or not-including yellow.

Embodiments of the invention provide for:
Reduced costs—only half of the components are required.
The single-camera single-lens solution is more compact, which is most important for stand-alone compact units.
There is no switching time between two cameras, which is also important for stand-alone units.
No need to mechanically calibrate two cameras.

System Component:
According to the embodiment of the invention, the following describes the details of each of the components:

Dual Band-Pass Filter (100)

The filter is designed to pass only two, narrow bands of wavelengths, while alternatives allow passage of another number (i.e., more than two) of wavelengths. According to one alternative embodiment, the filter is placed in front of the lens. It may include an anti-reflective coating to reduce ghost affects and glare.

Figure 2:
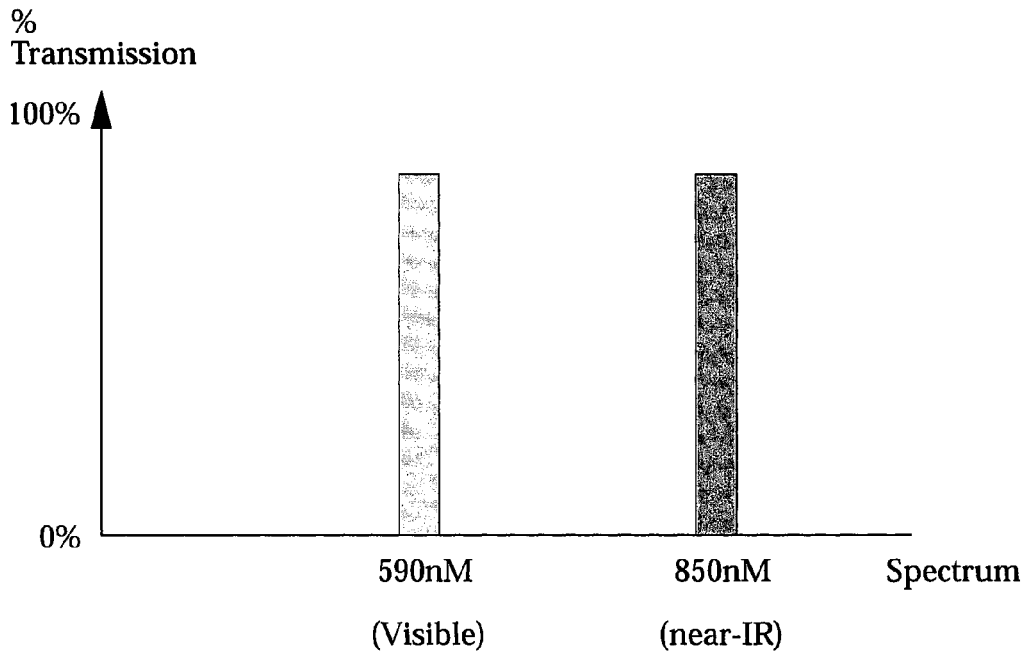
FIG. 2—Dual Band filter transmission chart, according to one embodiment of the invention.

FIG. 2 illustrates percent transmission of a filter. The bands selected for this filter are 590 nm (yellow) and 850 nm (near-IR), although this invention is certainly not limited to these values. Each band is narrow, with a 10 nm center width. This narrow band is designed to allow only a small amount of light that matches the spectrum of the illumination units.

The resulting image is substantially black for most of the image, except for the plate and other reflective surfaces on the front or rear of the vehicle.

Another embodiment of the invention, for example, may use a triple band-pass filter rather than a dual-band. The third band may be at the lower end of the visible spectrum (e.g., 440 nm). This can be useful in order to be able to determine the color of the body or plate of the vehicle using 3 values (R,G,B that stands for Red, Green and Blue).

Lens (110)

In order to prevent a focus change between the visible and near-IR spectrums, a day-night lens (aka "IR lens") can be used. This special lens maintains a clear, sharp image in both spectrums. The lens may have a fixed focal length or a variable focal length (such as with a varifocal lens), and a manual Iris. The filter is attached to the lens on the front side using its thread or a mounting bracket. The setting of the aperture may be set to medium position between maximal "open" (in order to reduce the required power of the illumination) and maximal "close" (i.e., minimal opening, to obtain a better depth of field).

The embodiment suggested is adapted for using visible light and near-IR as the predetermined narrow band spectrum ranges. However, it was already noted that this is not a limitation of the invention and alternative predetermined narrow band spectrum ranges can be used. In such alternative embodiments, using other spectrum ranges, the lens in use should be adapted to the predetermined spectrum ranges. Hence, instead of using the term "day/night lens", the more generic term "focus shift corrected lens" can be used.

The Camera (120)

The camera can be either an analog or a digital camera, provided that it operates in both visible and near-IR spectrums as most CCTV cameras do.

LEDs (131-132)

A number of Light-Emitting-Diodes (LEDs) are installed around the camera, inside the camera body, and/or on an outside assembly. The system requires a combination of near-IR LEDs (131) and yellow LEDs (132) that matches the spectrum of the dual-band filter. These are extra power LEDs that can use few units to cover the full field of view of the scene homogenously. Their intensity should be selected at a sufficient level so the reflective plates will be almost washed out while using the high illumination level.

Illumination Control (140)

Each LED array 131-132 should be capable to pulse in sync with the camera frame rate, and provide different illumination levels (for example, off/low/medium/high). The levels may be changed on field by the processor, in order to switch the illumination through various levels. Hence, it may be appreciated that the LEDs are triggered to illuminate wherein illuminating is performed in a known illumination level, while the illumination, or light emission, is timed with camera operation for acquiring an image.

According to another embodiment of the invention, both near-IR LEDs 131 and visible light LEDs 132 may be fired in parallel. However, this will result in a less contrast result, but may be found useful in some cases where high-speed traffic is involved.

Body and Power Supply (150)

The entire assembly can be packaged into a small unit, which includes the power supply that powers the cameras and illumination control.

Processor (200)

The processor may be either inside the camera (for a stand-alone all-in-one unit), on a detached processor, or across the network (for networked cameras). It interfaces with the camera with any camera interface (e.g., frame grabber, camera link, network and USB). The processor obtains images captured by the camera/illumination unit(s) 10, runs the LPR application 220, which activates the OCR program 210, and further conveys the results or reports thereabout.

OCR Program (210)

The OCR program analyzes the captured images, and outputs a recognition result. Its confidence is based on a number of images obtained from different spectrums and illumination levels.

LPR Application (220)

The LPR application controls the detection of the events, receives a detection signal from a sensor, determines the sequence of the illumination levels, captures the images in real time, activates the OCR program, and reports the recognition result and its confidence.

The system may be triggered on the moment the vehicle activates or deactivates an external hardware sensor, such as loop detector. According to another embodiment of the invention, with or without the external hardware sensor, the image acquiring module, while having near-IR as one of the predetermined spectrum ranges, can be used for Video Motion Detection (VMD). In this case the camera 120 continuously fires the near-IR LEDs 131, a spectrum which is invisible, and the processor 200 checks each image for motion. Only when the vehicle steps into the field of view of the lens 110 then the reflective plate is detected by a change in the scene. Then the process of firing the visible spectrum illumination by LEDs 132 follows, as previously described, hence both near-IR and visible spectrum images are obtained. The advantage in this case is that the camera/illumination unit is not seen by the driver, and only a brief burst of few fields will be observed.

Process:

According to one embodiment of the invention, the following describes a process flow for an event of a vehicle activating a hardware detector on the front of the vehicle. Following this trigger event the processor 200 starts a sequence of image captures.

Figure 3:
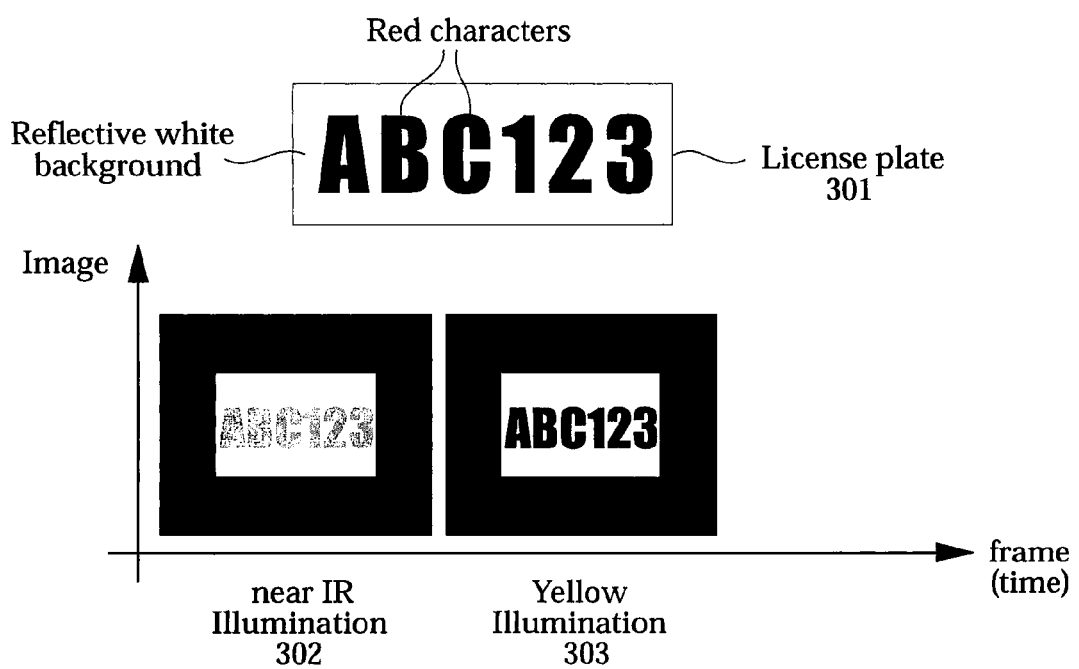
FIG. 3—Example of effect of dual-band capture performed according to one embodiment of the invention.

An illustrated example is seen in FIG. 3 with a red-on-white-reflective plate 301 and 2 illumination and capture fields: 302 (near-IR illumination) and 303 (yellow illumination).

On the first field 302, for example, the near-IR LEDS 131 are activated. The light illuminates the front of the vehicle, including its reflective plate. The illuminated scene is recorded by the camera 120, after passing the filter 100 and the lens 110. Since the band pass filter blocks all light except for its dual band, only the reflective surfaces will be visible on the camera, while the rest of the image will appear dark. After the camera 120 registers the image 302, it is conveyed to the processor 200. There an application 220 obtains the image digital data and performs OCR process 210 and a plate recognition result is obtained for this image.

On the next field 303, continuing the example, the visible (yellow) Light LEDs 132 are now pulsed. The process of image registration repeats, but in this case the recorded image 303 will be based on the visible spectrum which matches the band-pass spectrum of the filter 100. In the example of FIG. 3, this field provided the best contrast image 302 for the red-on-reflective white plate.

After collecting several images of either near-IR or visible (yellow) spectrum, the best image is determined from the quality of the recognition result. Since the series is performed on both spectrums, it is appreciated that one of the spectrums will yield contrast which is better than the contrast obtained with the other spectrum. For example—in monochromatic images acquired from a red-on-white plate (plate 301 in FIG. 3) the yellow illumination field 303 will yield better contrast (as seen in the example), when compared to the image acquired with near-IR illumination conditions. It is appreciated that in colored images, with near-IR illumination, the license plate's characters would appear almost red, while the background would appear pink. In a monochromatic image, on the other hand, the background will be almost white while the characters will appear in light grey. That is, monochromatic images of license plate 301, obtained under near-IR illumination are characterized by poor contrast. On the other hand, when illuminating with yellow emitted light and acquiring a monochromatic image, the background color appears almost white, while the characters appear dark grey. Hence, in monochromatic images taken of a license plate having red-characters on reflective white background, yellow illumination provides higher contrast compared to an image obtained in near-IR illumination conditions. However, this is not always the case. For example, in case of a black-on-white-reflective plate, near-IR illumination may provide better results compared to yellow illumination.

Further to discussing the apparatuses according to different embodiments of the invention, attention is drawn now to methods for acquiring images of car license plates.

According to certain embodiments of the invention, in order to acquire images of license plates of a car, light is emitted, e.g., from LEDs 131 and 132, in order to obtain reflection from the license plates. The light that is emitted constitutes "emitted light", while the light reflected by the car constitutes "reflected light".

The emitted light is in multiple predetermined spectrum ranges, while it is not necessary to emit the light of different ranges at the same time. For example, certain embodiments may emit light ("first light emission") in a certain range ("first predetermined spectrum range", or shortly "first range") and acquire an image ("first image"), and then emit second light emission in another range (constituting "second predetermined spectrum range", or shortly "second range") and acquire a second image. Alternative embodiments may emit the multiple predetermined spectrum ranges simultaneously and acquire one image, while still other embodiments may use a combination and, for example, emit light in two different ranges simultaneously while taking a first image and then emit light in a single, third range for acquiring a second image, etc.

It should be appreciated that the photosensor in the camera should be sensitive to the spectrum of the reflected light. Hence, it should be sensitive to the multiple predetermined spectrum ranges of the emitted light.

Before reaching the camera and/or photosensor, the reflected light is filtered so as to allow only wavelengths of said multiple predetermined spectrum ranges to reach a sensor of a camera; The light can penetrate the filter and pass therethrough constituting "filtered light". That is, the filtered light will be in the multiple predetermined spectrum ranges or there will be no filtered light, while in those cases when there is no filtered light, the camera will acquire an image having no details or almost no details inside, i.e., a poor contrast image.

When the filtered light reaches the camera and the photosensor, an image is acquired. According to one embodiment, wherein light of different predetermined ranges is emitted serially, that is, one color is emitted at a time, at least one image is acquired for each one of the multiple predetermined spectrum ranges of the emitted light. However, this is non-mandatory and other embodiments may acquire images for more than one range of emitted light.

According to certain embodiments, the simultaneous or serial emission of light of the multiple predetermined spectrum ranges is controlled by the illumination control board 140. The illumination control board may also control how images are acquired, whether at least one image is acquired for each one of the multiple predetermined spectrum ranges of the emitted light or whether an image is acquired for more than one range of emitted light.

In some embodiments a combination is allowed as well. Hence, for example, during daylight when emitting light the emitted light may include simultaneously light of multiple predetermined spectrum ranges, while in the evening and night, when background light become dimmed, it is possible to serially emit light of the different ranges. According to certain embodiments image acquiring may be controlled as well: sometimes one or more images can be acquired for each one of the multiple predetermined spectrum ranges of the emitted light, while in other times it is possible to acquire images for more than one range of emitted light.

Further to understanding how images are acquired in accordance with certain embodiments of the invention, it is appreciated that in an LPR (License Plate Recognition) system, the images are processed by an OCR (Optical Character Recognition) processor to extract the alphanumeric characters composing the registration string. The OCR processor may obtain images from the LPR system's camera using any applicable mean, such as via an interface board, which may be a frame grabber, network interface, camera link, USB or any other interface. If applicable, it may also obtain images stored in a storage device (such as disk or flash memory), thus allowing batch OCR processing. The OCR processor then analyses the information relating to the license plate and extracts the registration string.

It will be understood that parts of the system according to the invention may be a suitably programmed computer. Likewise, the invention contemplates a computer program being readable by a computer for executing methods of the invention. The invention further contemplates a machine-readable memory tangibly embodying a program of instructions executable by the machine for executing methods of the invention.

The invention claimed is:

1. An apparatus comprising:
   a camera comprising a lens;
   a filter coupled to the lens, the filter to allow only light having a wavelength within a yellow spectrum range and light having a wavelength within a near-infrared (IR) spectrum range to reach the lens, the yellow spectrum range comprising light having a wavelength within 10 nanometers of 590 nanometers and the near-IR spectrum range comprising light having a wavelength within 10 nanometers of 850 nanometers;
   a plurality of Light Emitting Diodes (LEDs), one or more of the plurality of LEDs to emit light within the yellow spectrum range and one or more of the plurality of LEDs to emit light within the near-IR spectrum range; and
   a control board coupled to the plurality of LEDs to control operation of the plurality of LEDs and the camera.

2. An apparatus comprising:
   a camera comprising a lens;
   a filter coupled to the lens, the filter to allow light having a wavelength within 10 nanometers of 590 nanometers and light having a wavelength within 10 nanometers of 850 nanometers to reach the lens;
   a plurality of Light Emitting Diodes (LEDs), one or more of the plurality of LEDs to emit light within 10 nanometers of 590 nanometers and one or more of the plurality of LEDs to emit light within 10 nanometers of 850 nanometers; and
   a control board coupled to the plurality of LEDs to control operation of the plurality of LEDs and the camera.

3. The apparatus of claim 2, wherein the control board is to control a timing of operation of the plurality of LEDs and the camera.

4. The apparatus of claim 2, wherein the control board is to control illumination levels of the plurality of LEDs.

5. The apparatus of claim 2, wherein the control board is to select a subgroup of the plurality of LEDs and to control operation of the subgroup.

6. The apparatus of claim 2, wherein the lens comprises a day/night lens.

7. The apparatus of claim 2, configured for vehicle motion detection (VMD).

8. The apparatus of claim 1, configured for vehicle motion detection (VMD).

9. The apparatus of claim 1, configured for vehicle body color recognition.

10. A method comprising:
    emitting light within a first spectrum range, the first spectrum range comprising light having a wavelength within 10 nanometers of 590 nanometers;
    filtering reflected light to allow only light within the first spectrum range and light within a second spectrum range to reach a sensor, the second spectrum range comprising light having a wavelength within 10 nanometers of 850 nanometers;
    detecting a change in the light within the first spectrum range that reaches the sensor; and
    based on the detecting, emitting light within the second spectrum range.

11. The method of claim 10, further comprising:
    acquiring one or more images.

12. The apparatus of claim 1, wherein the control board is to configure
    (a) the one or more of the plurality of LEDs that are to emit light within the yellow spectrum range, and
    (b) the one or more of the plurality of LEDs that are to emit light within the near-IR spectrum range
    to emit light simultaneously.

13. The apparatus of claim 1, wherein the control board is to configure
    (a) the one or more of the plurality of LEDs that are to emit light within the yellow spectrum range, and (b) the one or more of the plurality of LEDs that are to emit light within the near-IR spectrum range to emit light serially.

14. The apparatus of claim 2, wherein the control board is to configure
   (a) the one or more of the plurality of LEDs that are to emit light within 10 nanometers of 850 nanometers, and
   (b) the one or more of the plurality of LEDs that are to emit light within 10 nanometers of 590 nanometers to emit light simultaneously.

15. The apparatus of claim 2, wherein the control board is to configure
   (a) the one or more of the plurality of LEDs that are to emit light within 10 nanometers of 850 nanometers, and
   (b) the one or more of the plurality of LEDs that are to emit light within the near-IR spectrum range to emit light serially.

16. The method of claim 10, further comprising simultaneously emitting light within the first spectrum range and light within the second spectrum range.

17. The method of claim 10, further comprising serially emitting light within the first spectrum range and light within the second spectrum range.

18. The method of claim 11, wherein acquiring one or more images comprises acquiring one or more images corresponding to the first spectrum range and one or more images corresponding to the second spectrum range.

* * * * *